US008504603B2

(12) United States Patent
Yu

(10) Patent No.: US 8,504,603 B2
(45) Date of Patent: Aug. 6, 2013

(54) METHOD AND SYSTEM FOR PARALLEL COMPUTATION OF LINEAR SEQUENTIAL CIRCUITS

(75) Inventor: Meng-Lin Yu, Morganville, NJ (US)

(73) Assignee: LSI Corporation, San Jose, CA (US)

( * ) Notice: Subject to any disclaimer, the term of this patent is extended or adjusted under 35 U.S.C. 154(b) by 477 days.

(21) Appl. No.: 12/845,118

(22) Filed: Jul. 28, 2010

(65) Prior Publication Data
US 2012/0030450 A1 Feb. 2, 2012

(51) Int. Cl.
*G06F 7/00* (2006.01)

(52) U.S. Cl.
USPC ........................................................ 708/492

(58) Field of Classification Search
USPC .......................................... 708/492, 520, 607
See application file for complete search history.

(56) References Cited

U.S. PATENT DOCUMENTS

| 5,014,235 A | * | 5/1991 | Morton | 708/520 |
| 5,854,759 A | * | 12/1998 | Kaliski et al. | 708/492 |
| 7,302,627 B1 | | 11/2007 | Mimar | 714/741 |

\* cited by examiner

*Primary Examiner* — Tan V. Mai
(74) *Attorney, Agent, or Firm* — Kermit D. Lopez; Luis M. Ortiz; Ortiz & Ortiz, PLLC

(57) ABSTRACT

A method and system for parallel computation of a linear sequential circuit (LSC) based on a state transition matrix is disclosed herein. A multistep state transition matrix and a multistep output generation matrix can be pre-computed and stored in association with the linear sequential circuit. The multiple state transitions and the multiple output bits can be computed by multiplying the current input-state vector with a multistep next state transition matrix and a multistep output generation matrix, respectively. Multiple state transitions and multiple output bits can be generated in parallel in a single clock cycle based on the pre-computed state transition matrix and the output generation matrix utilizing a dot product in order to improve computational speed. Such a simple augmentation provides a flexible and inexpensive solution for high speedup linear sequential circuit computation with respect to a processor.

20 Claims, 4 Drawing Sheets

200 ↘

```
loop (total output bits needed/k) times
{
do{      ／201
     LSC(
        matrices pointers: Mk, Ok
        input={CurrentState, current k input
bits},
        output = {kth NextState, k output
bits}
        );
        collect k output bits; //maybe a no-op
        CurrentState = kth NextState;
        current k input bits = next k input bits;

METHOD AND SYSTEM FOR PARALLEL COMPUTATION OF LINEAR SEQUENTIAL CIRCUITS

TECHNICAL FIELD

Embodiments are generally related to linear sequential circuits. Embodiments are also related to parallel computing techniques and applications. Embodiments are additionally related to the parallel computation of a linear sequential circuit.

BACKGROUND OF THE INVENTION

A linear sequential circuit (LSC) is a sequential circuit in which each next state bit and each output bit is a linear combination with a modulo-2 addition or XOR logic of current state bits and input bits. Two important classes of LSC are a linear feedback shift register (LFSR) and a linear feed forward shift register (LFFSR). A linear feedback shift register can be employed as an additive scrambler, a multiplicative scrambler, an additive descrambler, and/or a turbo encoder. Similarly, a linear feed forward shift register can be employed as a convolution encoder and/or a multiplicative descrambler in a wide range of communication systems.

The majority of prior art linear sequential circuits can be implemented and/or mapped in association with a hardware setup such as, for example, a shift-register. The shift register typically includes a storage element for representing the state bits and XOR gates for representing the modulo-2 additions. Such prior art sequential circuits generate one bit of output in a single clock cycle, which is not adequate for a high-speed wireless communication system. Additionally, a traditional processor/DSP associated with the wireless communication system is not equipped to deal with the linear sequential circuit and each bit in the linear sequential circuit needs to be shifted, masked and manipulated in order to perform the linear sequential circuit computations. Furthermore, such linear sequential circuit requires a number of cycles to implement a single step transition. A look-up table can be alternatively designed to provide a modest computation speed with respect to the linear sequential circuit. Such an approach, however, provides limited computation speedup (usually 8 or less) due to the exponential cost increase required by the larger lookup table to support higher speedup.

Based on the foregoing, it is believed that a need exists for an improved method and system for parallel computation of a linear sequential circuit based on a state transition matrix in order to improve computational speed, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved linear sequential circuit (LSC) system and method.

It is another aspect of the disclosed embodiment to provide for an improved parallel computing system and method.

It is further aspect of the disclosed embodiment to provide for an improved system and method for parallel computation of an LSC based on a state transition matrix in order to improve computational speed.

The aforementioned aspects and other objectives and advantages can now be achieved as described herein. A method and system for parallel computation of a linear sequential circuit (LSC) based on a state transition matrix is disclosed herein. A multistep state transition matrix and a multistep output generation matrix can be pre-computed and stored in association with the linear sequential circuit (e.g., a linear feedback shift register, a linear feed forward shift register). The multiple state transitions and the multiple output bits can be computed by multiplying the current input-state vector with a multistep next state transition matrix and a multistep output generation matrix, respectively. Multiple state transitions and multiple output bits can be generated in parallel in a single clock cycle based on the pre-computed state transition matrix and the output generation matrix utilizing a dot product (e.g., Galois field dot product) in order to improve computational speed. Such a simple augmentation provides a flexible and inexpensive solution for high speedup linear sequential circuit computation with respect to a processor (e.g., traditional DSP).

The dot product can be computed utilizing a GF(2) binary finite field dot product accelerator. The multistep (k-step) state transition matrix and the multistep (k-step) output generation matrix can be represented as a control bit array in the linear sequential circuit. The multistep state transition matrix and the multistep output generation matrix can be loaded to a register of the processor. The combinational logic in a linear sequential circuit, can be efficiently implemented in a processor for augmenting a processor's instruction set for supporting a communication system. The next state transition matrix and the output generation matrix can be computed offline and preloaded into the matrix storage elements or control bit array in order to utilize the proposed instruction/intrinsic for a linear sequential circuit function. The instruction then takes the state-input vector as the input of the instruction and generates the next state and the output bits as the output of the instruction. The newly computed next state and the next input bits can be employed as the new state-input vector for computing the output and the instruction can then be put in a loop to generate as many output bits with a high computational speed.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 2 illustrates a pseudo code illustrating a parallel computation algorithm utilizing an instruction for generating multiple state transitions and multiple output bits in parallel in single clock cycle, in accordance with the disclosed embodiments;

DETAILED DESCRIPTION

The particular values and configurations discussed in these non-limiting examples can be varied and are cited merely to illustrate at least one embodiment and are not intended to limit the scope thereof.

Figure 1:
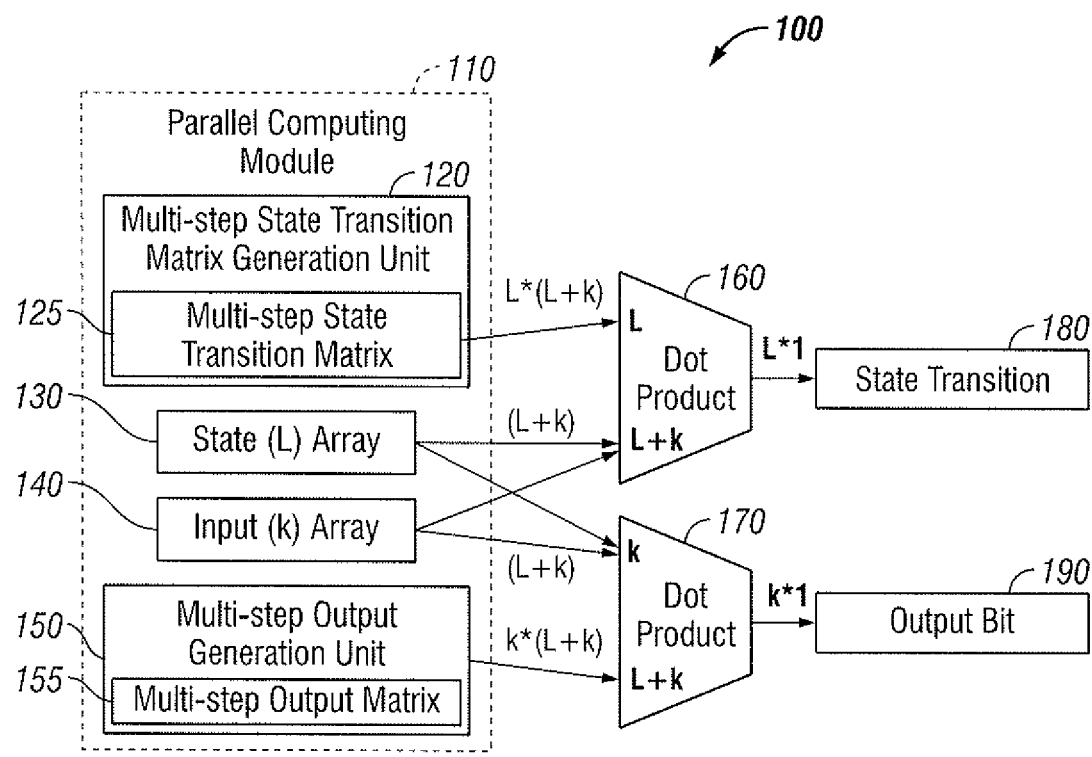
FIG. 1 illustrates a block diagram representing parallel computation in a linear sequential circuit, in accordance with the disclosed embodiments.

FIG. 1 illustrates a block diagram representing parallel computation in a linear sequential circuit 100, in accordance with the disclosed embodiments. The linear sequential circuit 100 depicted in FIG. 1 can be configured to include a parallel computing module 110 for improving the computational speed of the linear sequential circuit 100. Note that the linear sequential circuit 100 can be, such as, for example, a linear feedback shift register (LFSR), a linear feed forward shift register (LFFSR), or a combination of both, depending upon design considerations. Note that the LFSR is just a subset of LSC and there are LSC circuits that are neither LFSR nor LFFSR.

The parallel computing module 110 can be configured to include a multistep state transition matrix generation unit 120, a multistep output generation unit 150 and bit arrays, such as, for example, a state bit (L) array 130 and/or an input bit (k) array 140. The linear sequential circuit 100 can be further configured to include one or more dot product units such as, a Galois field GF(2) dot product unit 160 and/or 170 that performs vector-matrix multiplications with respect to the linear sequential circuit 100. Note that the dot product unit 160 and 170 can be configured from one or more AND gates and XOR gates.

The multistep state transition matrix generation unit 120 generally loads a multistep state transition matrix 125 with respect to the linear sequential circuit 100. Similarly, the multistep output generation unit 150 loads a multistep output generation matrix 155 with respect to the linear sequential circuit 100. The dot product unit 160 further generates multiple state transitions 180 utilizing the state transition matrix 125 and input/state bit arrays 130 and 140. Similarly, the dot product unit 170 generates multiple output bits 190 utilizing the output matrix 155 and input/state bit arrays 130 and 140 in the linear sequential circuit 100.

The state transitions 180 and the output bits 190 can be computed by multiplying the current input-state vector with a multistep next state transition matrix ($M^k$) 125 and a multi-step output generation matrix ($O^k$) 155, respectively. The dot product units 160 and 170 can be further employed to improve the computational speed in the linear sequential circuit 100. The output bits 190 can be generated by computing k Galois field GF(2) dot products of length (L+k) and the state transitions 180 can be generated by computing L Galois field GF(2) dot products of length (L+k) in log(L+k)*Delay_XOR+1*Delay_AND gate delays.

Note that the dot product unit(s) 160 and 170 can be also viewed/utilized as a GF(2) binary finite field dot product accelerator. In such a case, one of the input vectors of the dot products 160 and 170 can be employed as an input-state. The other input of the dot product unit 160 is the k-step state transition matrix 125 while the other input of the dot product unit 170 is the k-step output generation matrix 155. The dot product results can be produced as the bit(s) of k-step next state and the next k output bit(s) in one cycle. Such a simple augmentation provides a very flexible, inexpensive solution for a high performance and a high speedup linear sequential circuit computation with respect to the processor.

FIG. 2 illustrates a pseudo code 200 utilizing an LSC instruction/intrinsic 201 implementing the linear sequential circuit 100 in a loop, in accordance with the disclosed embodiments. The combinational logic in the linear sequential circuit 100, can be efficiently implemented in a processor for augmenting a processor's instruction set for supporting a communication system. The LSC instruction 201 augments the instruction set of the processor for generating multiple state transitions 180 and multiple output bits 190 in parallel in single clock cycle. The LSC instruction 201 can be implemented as a loop in the pseudo code 200 in order to generate as many output bits with a high computational speed. Note that in FIGS. 1-5 identical parts or elements are generally indicated by identical reference numerals. The next state transition matrix ($M^k$) 125 and the next state output generation matrix ($O^k$) 155 can be pre-computed offline and preloaded into a matrix storage element (can be implemented with processor's registers or as a control bit array) in order to utilize the LSC instruction 201. The next state transition matrix ($M^k$) 125 and the next state output generation matrix ($O^k$) 155 can be loaded in the linear sequential circuit 100 in order to compute a new linear sequential circuit function. The new linear sequential circuit function can be further implemented by the pseudo code 200.

The pseudo code 200 considers the state-input vector as the input of the LSC instruction 201 and generates the next km state transition 180 and k output bits 190 as the output of the 201. The newly computed next transition state 180 and the next input bits (0 or n*k input bits) can be utilized as the new state-input vector and the instruction can be placed in a loop in order to produce the output bits 190 in the linear sequential circuit 100. Note that the output bits 190 generated by the linear sequential circuit 100 are multiples of 'k' and the residue bits are computed separately. The total output bits 190 of the linear sequential circuit 100 can be much greater than 'k' and therefore the residue bits are computed without affecting the overall performance of the linear sequential circuit 100.

Figure 3:
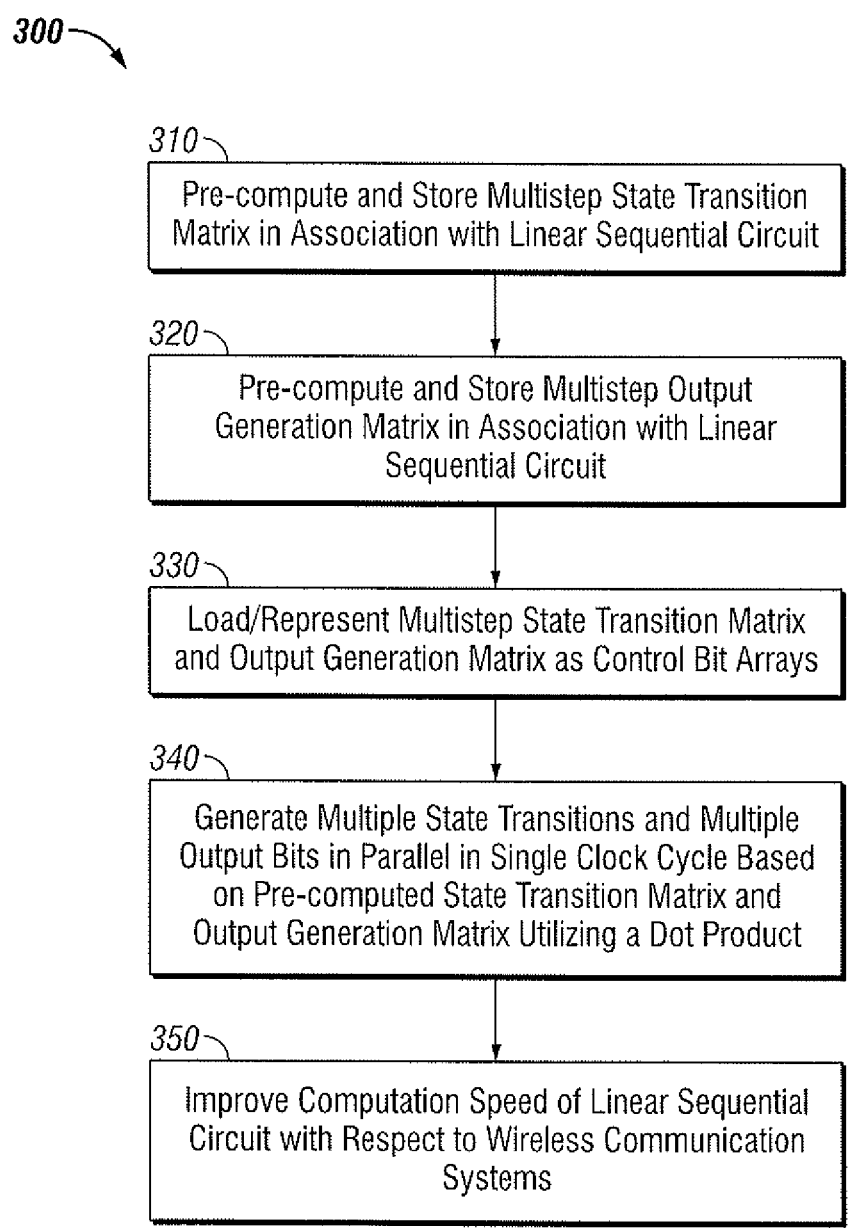
FIG. 3 illustrates a high level flow chart of operation illustrating logical operational steps of a method for parallel computation of a linear sequential circuit based on a state transition matrix, in accordance with the disclosed embodiments.

FIG. 3 illustrates a high level flow chart of operation illustrating logical operational steps of a method 300 for parallel computation of the linear sequential circuit 100 based on a state transition matrix, in accordance with the disclosed embodiments. Note that the method 300 can be implemented as instructions stored and retrieved from a computer memory of a data-processing apparatus (e.g., computer, sever, etc) and then processed by a processor of such a data-processing apparatus. Thus, for example, the operations depicted at blocks 310 to 350 may be implemented via such instructions.

In general, the multistep state transition matrix 125 can be pre-computed and stored in association with the linear sequential circuit 100, as illustrated at block 310. The multi-step output generation matrix 155 can be pre-computed and stored in association with the linear sequential circuit 100, as indicated at block 320. The multistep state transition matrix 125 and the multistep output matrix 155 can be loaded into matrix storage elements or represented as control bit arrays, as depicted at block 330.

Further, the multiple state transitions 180 and the multiple output bits 190 can be generated in parallel in a single clock cycle based on the pre-computed state transition matrix 125 and output generation matrix 155 utilizing the dot products 160 and 170, as illustrated at block 340. The output bits 190 and the state transitions 180 can be thereafter utilized to improve the computational speed of the linear sequential circuit 100 with respect to the high speed wireless communication systems, as indicated at block 350.

The output bits 190 and the state transitions 180 can be computed by multiplying the current input state vector with the next state output generation matrix ($O^k$) and the next state transition matrix ($M^k$) respectively.

The next state (single step) of the LSC computations can be represented as follows:

$$\hat{s}^{t+1} = \begin{pmatrix} s_0^{t+1} \\ s_1^{t+1} \\ s_2^{t+1} \\ \ldots \\ s_{L-1}^{t+1} \end{pmatrix} = M * \begin{pmatrix} s_0^t \\ s_1^t \\ s_2^t \\ \ldots \\ s_{L-1}^t \\ i_0 \\ \ldots \\ i_m \end{pmatrix} = M \begin{pmatrix} \hat{s}^t \\ \hat{i}^t \end{pmatrix} \quad (1)$$

Where $\hat{s}^t$ represents the current state at time (t) and 'M' represents the single step state transition matrix of the linear sequential circuit 100.

The output of the linear sequential circuit 100 can be represented as follows:

$$\hat{O}^t = \begin{pmatrix} O_0^t \\ O_1^t \\ O_2^t \\ \ldots \\ O_{n-1}^t \end{pmatrix} = O * \begin{pmatrix} s_0^t \\ s_1^t \\ s_2^t \\ \ldots \\ s_{L-1}^t \\ i_0 \\ \ldots \\ i_m \end{pmatrix} = O \begin{pmatrix} \hat{s}^t \\ \hat{i}^t \end{pmatrix} \quad (2)$$

Where, 'O' represents the single step output generation matrix with respect to the linear sequential circuit parallel computing system parallel computing system 100.

Note that without loss of generality, one input bit (i.e., m=1) and one output bit (i.e., n=1) is utilized for the following description. The k-step next state transition matrix ($M^k$) can be computed as follows: starting from $M^1$, $$M^1 = \begin{pmatrix} M & 0 & 0 & \ldots & 0 & 0 \\ 0 & 1 & & & & \\ 0 & & 1 & & & \\ \ldots & & & \ldots & & \\ 0 & & & & 1 & \\ 0 & & & & & 1 \\ 0 & 0 & 0 & \ldots & 0 & 0 \end{pmatrix} \begin{matrix} \\ \\ \\ \text{K extra rows} \\ \\ \\ \end{matrix} \quad (3)$$

K-1 extra columns

If $\hat{i}^t$ denotes a vector of the next input values at time (t), then the single step state transition can be represented as follows:

$$M^1 * \begin{pmatrix} \hat{s}^t \\ \hat{i}^t \end{pmatrix} = M * \begin{pmatrix} \hat{s}^t \\ \hat{i}^t \end{pmatrix} + \begin{pmatrix} 0 \\ 0 \\ \ldots \\ 0 \\ i^{t+1} \\ i^{t+2} \\ \ldots \\ i^{t+k-1} \\ 0 \end{pmatrix} = \begin{pmatrix} s_0^{t+1} \\ s_1^{t+1} \\ \ldots \\ s_{L-1}^{t+1} \\ i^{t+1} \\ i^{t+2} \\ \ldots \\ i^{t+k-1} \\ 0 \end{pmatrix} \quad (4)$$

By repeatedly using the equation (4) for k times, the next state transition matrix ($M^k$) can be represented as follows:

$$M^k = M^1 * M^1 * \ldots * M^1 \quad (5)$$

On constructing the next state transition matrix ($M^k$), the lower k rows can be dropped and the dimensions of the next state transition matrix ($M^k$) can be reduced to L*(L+k).

The next state output generation matrix 155 with respect to the linear sequential circuit 100 can be represented as follows:

$$O^k = \begin{pmatrix} O^1 \\ O^1 * M^1 \\ O^1 * M^2 \\ \ldots \\ O^1 * M^{k-1} \end{pmatrix} \quad (6)$$

Since $O^1$ and $M^i$ for all 'i' values are constant, the output generation matrix 155 and the state transition matrix 125 can be pre-computed offline.

Figure 4:
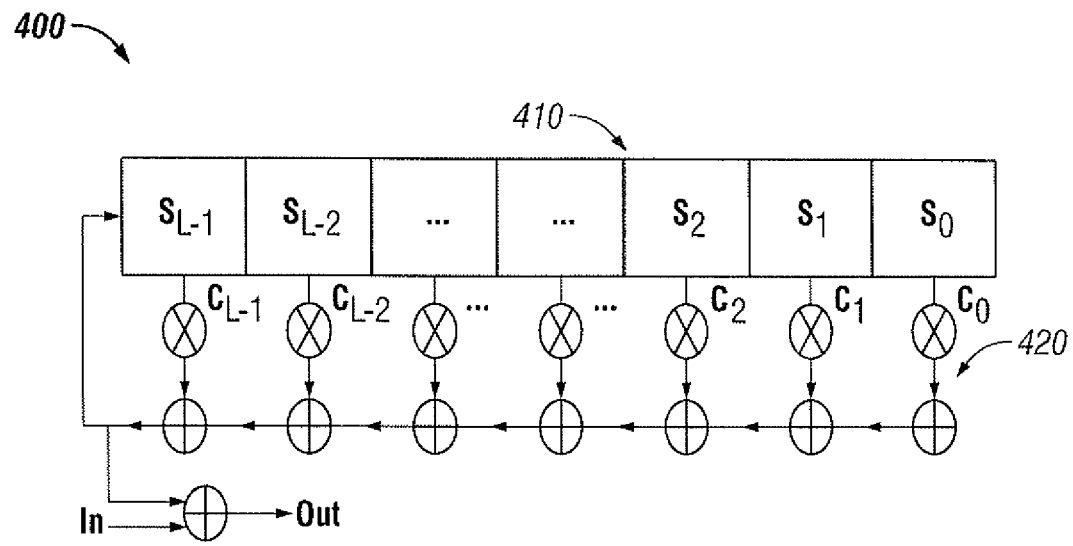
FIG. 4 illustrates a circuit diagram of an additive linear feedback shift register, in accordance with the disclosed embodiments.

FIG. 4 illustrates a circuit diagram of an additive linear feedback shift register (LFSR) 400, in accordance with the disclosed embodiments. The linear feedback shift register 400 represents a generic model of the linear sequential circuit 100. The linear feedback shift register 400 includes a feedback shifter unit 410 associated with XOR and AND gates 420. The feedback shifter unit 410 provides one or more feedback terms (such as, $C_{L-1}, C_{L-2}, \ldots C_2, C_1$ and $C_0$) with respect to the linear feedback shift register 400. The state transition matrix 125 with respect to the linear feedback shift register 400 can be represented as follows:

$$\begin{pmatrix} s_0^{t+1} \\ s_1^{t+1} \\ s_2^{t+1} \\ \ldots \\ s_{L-1}^{t+1} \end{pmatrix} = \begin{pmatrix} 0 & 1 & 0 & 0 & 0 & \ldots & 0 \\ 0 & 0 & 1 & 0 & 0 & \ldots & 0 \\ & & & \ldots & & & \\ & & & \ldots & & & \\ 0 & 0 & 1 & 0 & 0 & \ldots & 0 \\ C_0 & C_1 & C_2 & \ldots & \ldots & C_{L-2} & C_{L-1} \end{pmatrix} * \begin{pmatrix} s_0^t \\ s_1^t \\ s_2^t \\ \ldots \\ s_{L-1}^t \end{pmatrix} \quad (7)$$

The matrix notation of the state transition matrix 125 can be represented as follows:

$$\hat{s}^{t+1} = M^1 * \hat{s}^t \quad (8)$$

The output of the linear feedback shift register 400 can be represented as follows:

$$Out^t = s_{L-1}^{t+1} + in^t \qquad (9)$$
$$= s_0^t * c_0 + s_1^t * c_1 + s_2^t * c_2 + \ldots + s_{L-2}^t * c_{L-2} + s_{L-1}^t * c_{L-1} + in^t$$

The output generation matrix 155 of the linear feedback shift register 400 can be represented as follows:

$$\begin{pmatrix} out_0^t \\ out_0^{t+1} \\ out_0^{t+2} \\ \ldots \\ out_0^{t+L-1} \end{pmatrix} = \begin{pmatrix} s_0^t & s_1^t & s_2^t & \ldots & s_{L-1}^t \\ s_0^{t+1} & s_1^{t+1} & s_2^{t+1} & \ldots & s_{L1}^{t+1} \\ s_0^{t+2} & s_1^{t+2} & s_2^{t+2} & \ldots & s_{L1}^{t+2} \\ & & \ldots & & \\ s_0^{t+2} & s_1^{t+2} & s_2^{t+2} & \ldots & s_{L-1}^{t+2} \end{pmatrix} * \begin{pmatrix} C_0 \\ C_1 \\ C_2 \\ \ldots \\ C_{L-1} \end{pmatrix} + \begin{pmatrix} in^t \\ in^{t+1} \\ in^{t+2} \\ \ldots \\ In^{t+L-1} \end{pmatrix} \qquad (10)$$

Figure 5:
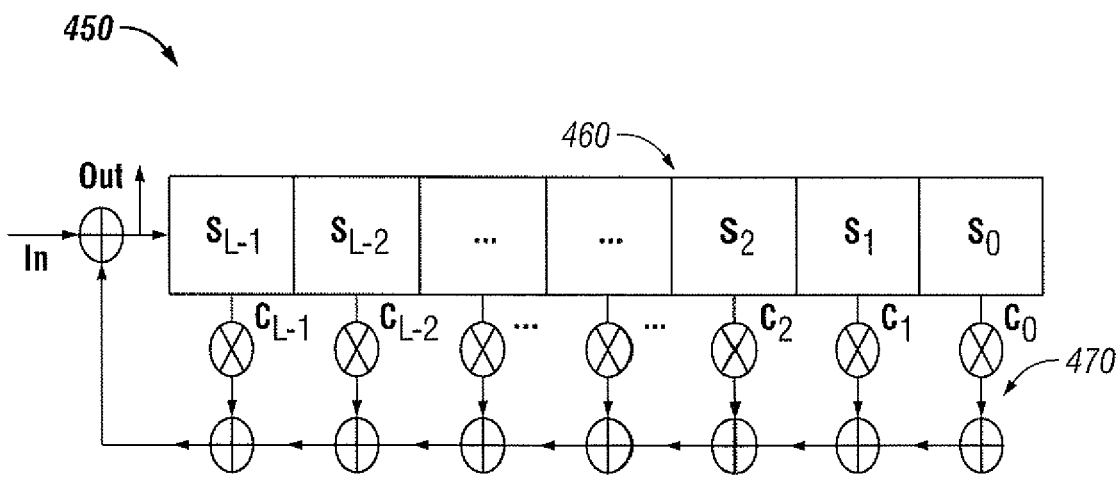
FIG. 5 illustrates a circuit diagram of a multiplicative linear feedback shift register, in accordance with the disclosed embodiments.

FIG. 5 illustrates a circuit diagram of a multiplicative linear feedback shift register (LFSR) 450, in accordance with the disclosed embodiments. The multiplicative linear feedback shift register 450 can be employed in a turbo encoder of a LTE/WCDMA (long term evolution/wideband code division multiple access). The multiplicative linear feedback shift register 450 includes a feedback shifter unit 460 associated with XOR and AND gates 470. The feedback shifter unit 460 provides one or more feedback terms (such as, $C_{L-1}$, $C_{L-2}$, ... $C_2$, $C_1$ and $C_0$) with respect to the linear feedback shift register 450. If the input ($in^t$) at time (t) is represented as $s_L$, then, $in^{t+1}=s_{L+1}$ and $in^{t+2}=S_{L+2}$, etc. The state transition matrix 125 with respect to the multiplicative linear feedback shift register 450 can be represented as follows:

$$\begin{pmatrix} s_0^{t+1} \\ s_1^{t+1} \\ \ldots \\ s_{L-1}^{t+1} \\ s_L^{t+1} \\ \ldots \\ s_{L+k-1}^{t+1} \end{pmatrix} = \qquad (11)$$

$$\begin{pmatrix} 0 & 1 & 0 & 0 & & & & \ldots & 0 \\ 0 & 0 & 1 & 0 & & & & \ldots & 0 \\ & & & & & & & & \\ 0 & 0 & 0 & 0 & \ldots & 1 & 0 & \ldots & 0 \\ C_0 & C_1 & C_2 & \ldots & C_{L-1} & 1 & 0 & \ldots & 0 \\ 0 & 0 & 0 & & \ldots & & 1 & 0 & \ldots & 0 \\ & & & & \ldots & & & & \\ & & & & \ldots & & & & \\ 0 & 0 & 0 & & \ldots & & 0 & 1 & 0 \\ 0 & 0 & 0 & & \ldots & & 0 & 0 & 1 \end{pmatrix} * \begin{pmatrix} s_0^t \\ s_1^t \\ \ldots \\ s_{L-1}^t \\ s_L^t \\ \ldots \\ s_{L+k-1}^t \end{pmatrix}$$

The last row in the above matrix represents the next state transition for the last input bit ($in_{L-1}$) of the multiplicative linear sequential feedback shift register 450. The output (out) with respect to the multiplicative linear sequential feedback shift register 450 can be any linear combination of the state and input, i.e., out=$O^1*\hat{s}$, where $O^1$ is the output generating row vector which is equal to (1 0 0 ... 0).

The linear sequential circuit 100 executes a parallel computation algorithm in order to compute the dot product of large dimensional vectors at very high speeds. The system and method can be therefore effectively utilized in a wide range of wireless communication systems such as, 3G, 4G, and Wi-Max in order to effectively provide parallel computation in the linear sequential circuit.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for parallel computation of a linear sequential circuit, said method comprising:
    pre-computing a multistep state transition matrix and a multistep output generation matrix in order to thereafter store said multistep state transition matrix and said multistep output generation matrix in a matrix storage; and
    generating a plurality of state transitions and a plurality of output bits in parallel in a single dock cycle based on said pre-computed multistep state transition matrix and said multistep output generation matrix utilizing a dot product unit in order to improve computational speed with respect to a processor.

2. The method of claim 1 further comprising computing said plurality of state transitions and said plurality of output bits by a vector-matrix multiplication of a current input-state vector with a next state transition matrix and an output generation matrix.

3. The method of claim 1 further comprising representing said multistep state transition matrix and said multistep output generation matrix as a control bit array.

4. The method of claim 1 further comprising loading said multistep state transition matrix and said multistep output generation matrix into a register associated with said processor.

5. The method of claim 1 further comprising computing said next state transition matrix and said next state output generation matrix offline in order to thereafter preload said next state transition matrix and a next state output generation into said matrix storage.

6. The method of claim 1 further comprising computing said dot product with respect to said next state multistep state transition matrix and multistep output generation matrix in order to generate said plurality of state transitions and said plurality of output bits.

7. The method of claim 1 further comprising implementing a combinational logic associated with said linear sequential circuit in said processor for augmenting an instruction set of said processor.

8. The method of claim 1 further comprising computing said multistep state transition matrix and said multistep output generating matrix via a parallel computation algorithm.

9. The method of claim 1 wherein said dot product comprises a Galois field GF(2) dot product.

10. The method of claim 9 further comprising configuring said Galois field GF(2) dot product to comprise an electronic logic gate.

11. The method of claim 10 wherein said electronic logic gate comprises an AND gate.

12. The method of claim 10 wherein said electronic gate comprises an XOR gate.

13. The method of claim 1 wherein said dot product unit comprises a Galois field GF(2) binary finite field dot product accelerator.

14. A system for parallel computation of a linear sequential circuit, said system comprising:
- a processor;
- a data bus coupled to said processor; and
- a non-transitory computer-usable medium embodying computer code, said non-transitory computer-usable medium being coupled to said data bus, said computer program code comprising instructions executable by said processor and configured for:
  - pre-computing a multistep state transition matrix and a multistep output generation matrix in order to thereafter store said multistep state transition matrix and said multistep output generation matrix in a matrix storage; and
  - generating a plurality of state transitions and a plurality of output bits in parallel in a single clock cycle based on said pre-computed multistep state transition matrix and said multistep output generation matrix utilizing a dot product unit in order to improve computational speed with respect to a processor.

15. The system of claim 14 wherein said instructions are further configured for calculating said plurality of state transitions and said plurality of output bits by a vector-matrix multiplication of a current input-state vector with a next state transition matrix and an output generation matrix.

16. The system of claim 14 wherein said instructions are further configured for representing said multistep state transition matrix and said multistep output generation matrix as a control bit array.

17. The system of claim 14 wherein said instructions are further configured for loading said multistep state transition matrix and said multistep output generation matrix into a register associated with said processor.

18. The system of claim 14 wherein said instructions are further configured for computing said next state transition matrix and said next state output generation matrix offline in order to thereafter preload said next state transition matrix and a next state output generation into said matrix storage.

19. The system of claim 14 wherein said instructions are further configured for computing said dot product with respect to said next state multistep state transition matrix and multistep output generation matrix in order to generate said plurality of state transitions and said plurality of output bits.

20. A system for parallel computation of a linear sequential circuit, said system comprising:
- a processor;
- a data bus coupled to said processor; and
- a non-transitory computer-usable medium embodying computer code, said non-transitory computer-usable medium being coupled to said data bus, said computer program code comprising instructions executable by said processor and configured for:
  - pre-computing a multistep state transition matrix and a multistep output generation matrix in order to thereafter store said multistep state transition matrix and said multistep output generation matrix in a matrix storage;
  - generating a plurality of state transitions and a plurality of output bits in parallel in a single clock cycle based on said pre-computed multistep state transition matrix and said multistep output generation matrix utilizing a dot product unit in order to improve computational speed with respect to a processor; and
  - implementing a combinational logic associated with said linear sequential circuit in said processor for augmenting an instruction set of said processor.

\* \* \* \* \*